United States Patent
Du

(10) Patent No.: US 10,680,921 B2
(45) Date of Patent: *Jun. 9, 2020

(54) VIRTUAL INTELLIGENT PLATFORM MANAGEMENT INTERFACE FOR HARDWARE COMPONENTS

(71) Applicant: VMware, Inc., Palo Alto, CA (US)

(72) Inventor: Haishan Du, Beijing (CN)

(73) Assignee: VMware, Inc., Palo Alto, CA (US)

( * ) Notice: Subject to any disclaimer, the term of this patent is extended or adjusted under 35 U.S.C. 154(b) by 469 days.

This patent is subject to a terminal disclaimer.

(21) Appl. No.: 15/200,705

(22) Filed: Jul. 1, 2016

(65) Prior Publication Data

US 2016/0315838 A1 Oct. 27, 2016

Related U.S. Application Data

(63) Continuation of application No. 13/560,530, filed on Jul. 27, 2012, now Pat. No. 9,384,018.

(51) Int. Cl.
| | |
|---|---|
| *H04L 12/26* | (2006.01) |
| *G06F 11/26* | (2006.01) |
| *G06F 9/455* | (2018.01) |
| *G06F 11/30* | (2006.01) |

(Continued)

(52) U.S. Cl.
CPC ......... *H04L 43/0817* (2013.01); *G06F 9/455* (2013.01); *G06F 11/261* (2013.01); *G06F 11/30* (2013.01); *H04L 43/065* (2013.01); *H04L 43/50* (2013.01); *G06Q 30/06* (2013.01); *H04N 5/4403* (2013.01)

(58) Field of Classification Search
None
See application file for complete search history.

(56) References Cited

U.S. PATENT DOCUMENTS

| | | | |
|---|---|---|---|
| 6,466,917 | B1 | 10/2002 | Goyal |
| 7,127,404 | B1 | 10/2006 | Poon |
| 7,203,721 | B1 | 4/2007 | Ben-Efraim |

(Continued)

OTHER PUBLICATIONS

Office Action dated Jul. 9, 2014 in U.S. Appl. No. 13/560,530.

(Continued)

*Primary Examiner* — Jeffrey R Swearingen
(74) *Attorney, Agent, or Firm* — Clayton, McKay & Bailey, PC

(57) ABSTRACT

Methods and systems configured to interact with hardware components of a computer system are described. In some embodiments, the system includes a processor and a memory coupled with the processor, wherein the memory is configured to provide the processor with instructions for generating, by a software module executing on the system, an Intelligent Platform Management Interface (IPMI) request configured for a controller of the computer system; transmitting, by the software module, the IPMI request to a server separate from the computer system, wherein the server is configured to emulate the controller of the computer system; and receiving, by the software module, an IPMI response from the server, wherein the IPMI response is based on a simulated operating condition of a hardware component of the computer system at the server, thereby obviating a manual adjustment of the hardware component on the computer system.

20 Claims, 5 Drawing Sheets

(51) Int. Cl.
    *G06Q 30/06*        (2012.01)
    *H04N 5/44*         (2011.01)

(56) References Cited

U.S. PATENT DOCUMENTS

| | | |
|---|---|---|
| 7,219,123 B1 | 5/2007 | Fiechter |
| 8,359,585 B1 | 1/2013 | Spinner |
| 8,484,618 B2 | 7/2013 | Spinner |
| 2004/0034496 A1 | 2/2004 | Correll |
| 2005/0172176 A1* | 8/2005 | Ortiz .................. G06F 11/24 |
| | | 714/47.2 |
| 2007/0016827 A1* | 1/2007 | Lopez, Jr. ........... G06F 11/2294 |
| | | 714/31 |
| 2007/0230736 A1 | 10/2007 | Boesen |
| 2008/0244571 A1 | 10/2008 | Bennett |
| 2009/0013258 A1 | 1/2009 | Hintermeister |
| 2009/0049235 A1 | 2/2009 | Schreiber |
| 2009/0106480 A1 | 4/2009 | Chung |
| 2009/0228579 A1 | 9/2009 | Sanghvi |
| 2012/0017074 A1 | 1/2012 | Kelly |
| 2012/0173931 A1 | 7/2012 | Kube |
| 2012/0265490 A1 | 10/2012 | Kube |

OTHER PUBLICATIONS

Final Office Action dated Mar. 13, 2015 in U.S. Appl. No. 13/560,530.
Office Action dated Jul. 16, 2015 in U.S. Appl. No. 13/560,530.

\* cited by examiner

VIRTUAL INTELLIGENT PLATFORM MANAGEMENT INTERFACE FOR HARDWARE COMPONENTS

This application is a continuation of U.S. application Ser. No. 13/560,530, filed Jul. 27, 2012, the entire contents of which are hereby expressly incorporated by reference.

BACKGROUND

Test automation is critical for assessing and improving the quality of a computer system. However, testing of various hardware components in a computer system traditionally requires certain physical acts to be performed on the hardware components, making such testing processes difficult to automate. For example, to test the behavior of a computer system when a fan is unplugged from the motherboard of the computer system, a human operator may need to perform certain physical acts. That is, the human operator may need to manually open the computer system's chassis, locate the fan on the motherboard and the wires that connect to the fan, and physically pull the wires in order to unplug the fan and proceed with the testing. Also, if the human operator has trouble physically accessing the computer system or interacting with the hardware components of the computer system, then the testing of such hardware components becomes not only time consuming but also limited in coverage.

In addition, conventional automated testing approaches fail to consider certain conditions of a computer system. One example condition may be that a hardware component of the computer system is under development or is unavailable for testing. Another example condition may be that certain errors of the computer system frequently occur when the computer system includes one or more malfunctioning or failing hardware components.

SUMMARY

Methods and systems configured to interact with hardware components of a computer system are described. In some embodiments, the system includes a processor and a memory coupled with the processor, wherein the memory is configured to provide the processor with instructions for generating, by a software module executing on the system, an Intelligent Platform Management Interface (IPMI) request configured for a controller of the computer system; transmitting, by the software module, the IPMI request to a server separate from the computer system, wherein the server is configured to emulate the controller of the computer system; and receiving, by the software module, an IPMI response from the server, wherein the IPMI response is based on a simulated operating condition of a hardware component of the computer system at the server, thereby obviating a manual adjustment of the hardware component on the computer system.

DETAILED DESCRIPTION

Figure 1:
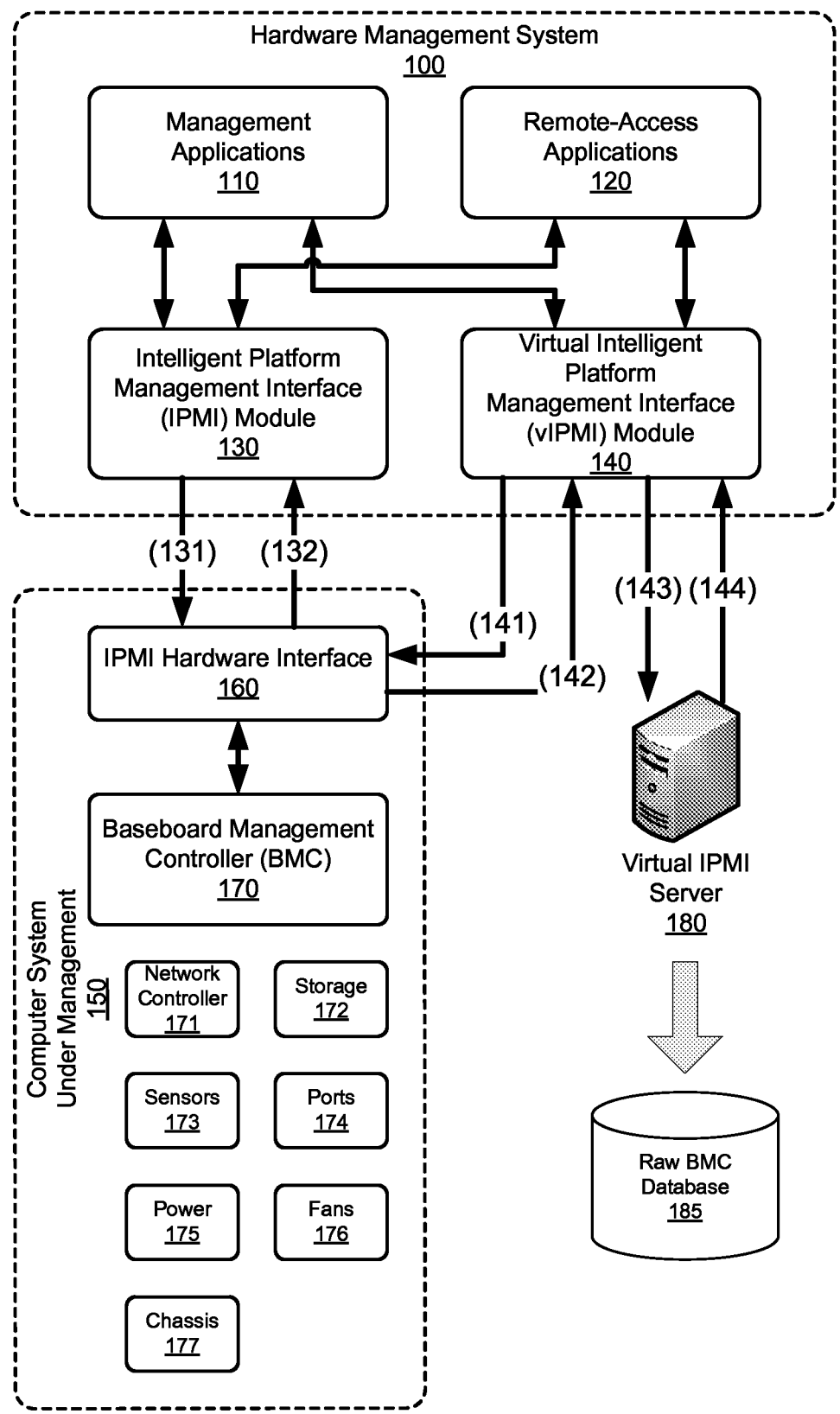
FIG. 1 illustrates one example of a virtual Intelligent Platform Management Interface (IPMI) environment configured to provide autonomous monitoring and managing of hardware components and firmware of a computer system, according to one embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Intelligent Platform Management Interface (IPMI) refers to a standardized computer system interface for managing hardware components and monitoring operations of a computer system. IPMI also defines a hardware-level interface that utilizes IPMI messages to interact with the hardware components of the computer system. To automate testing of hardware components in a computer system, according to one embodiment of the present disclosure, a virtual Intelligent Platform Management Interface environment may be designed and implemented. The virtual IPMI environment may include a virtual IPMI module and a virtual IPMI server. User applications may interface with the virtual IPMI module to monitor or manage the hardware components of a computer system. The virtual IPMI module may also communicate with the virtual IPMI server, which may emulate a controller monitoring the behavior of the hardware components under various operating conditions. The user application may receive from the virtual IPMI module replies that are based on simulated operating conditions of the hardware components at the virtual IPMI server.

FIG. 1 illustrates one example of a virtual Intelligent Platform Management Interface environment configured to provide autonomous monitoring and managing of hardware components and firmware of a computer system, according to one embodiment of the present disclosure. In FIG. 1, a hardware management system 100 may be configured to monitor and manage a computer system 150 and interact with a virtual IPMI server 180, which may be configured to emulate some of the behaviors of the computer system 150 and simulate the operating conditions of the hardware components in the computer system 150. The hardware management system 100 may then utilize the simulated operating conditions of these hardware components for testing purposes.

In one embodiment, the hardware management system 100 may include software modules such as, without limitation, one or more management applications 110, one or more remote-access applications 120, an IPMI module 130, and a virtual IPMI module 140. The computer system 150 may be any personal computer, laptop computer, handheld device, or server computer. The computer system 150 may contain an IPMI hardware interface 160, a baseboard management controller (BMC) 170, and one or more hardware components such as, without limitation, a network controller 171, a storage 172, sensors 173, ports 174, power 175, fans 176, and chassis 177. Additional hardware components not shown in FIG. 1 may include, without limitation, CPU, memory, graphic card, and buses. The virtual IPMI server 180 may be a networked computer system, separate from the computer system 150, configured to emulate a BMC, such as the BMC 170.

In one embodiment, the hardware management system 100 may be installed on the computer system 150. In this case, the management applications 110 may be executing on an operating system (OS, not shown in FIG. 1) of the computer system 150. The IPMI module 130 and/or the virtual IPMI module 140 may be device drivers that are loaded into the kernel of the OS. The IPMI module 130 may be a conventional IPMI driver such as the ones provided by INTEL® or DELL®. The virtual IPMI module 140 may be compatible with the IPMI module 130, so that the management applications 110, which may originally be designed to interact with the IPMI module 130, can now interact with the virtual IPMI module 140 without having to install/uninstall the IPMI module 130 or making any changes. Therefore, the virtual IPMI module 140 may contain some or all of the functionalities of the IPMI module 130, and have the same or similar interfaces as the ones provided by the IPMI module 130. The IPMI module 130 may become optional and removed once the virtual IPMI module 140 is in place.

In one embodiment, the IPMI module 130 and/or the virtual IPMI module 140 may interact with the IPMI hardware interface 160 via connections internal to the computer system 150. In an alternative embodiment, the hardware management system 100 may be executing on a remote OS of a remote system which is physically separated from the computer system 150. In this case, the remote-access applications 120 may be executing on the remote OS, and the IPMI module 130 and/or the virtual IPMI module 140 may be loaded into the kernel of the remote OS. In this case, the virtual IPMI module 140 may interact with the IPMI hardware interface 160 and/or the virtual IPMI server 180 via network communications. The management applications 110 and the remote-access applications 120 may also be referred to as "user applications," which may issue user application inquires to the IPMI module 130 and/or virtual IPMI module 140 for monitoring and managing the computer system 150.

The BMC 170 may be a microcontroller that is configured to implement features and functions associated with IPMI. For example, the BMC 170 may be configured to perform autonomous monitoring, event logging, and recovery control of the various computer components in the computer system 150. The BMC 170 may utilize the IPMI hardware interface 160 for sending and receiving IPMI messages. Specifically, the IPMI module 130 may be configured to interact with the BMC 170 via the IPMI hardware interface 160. The virtual IPMI module 140 may be configured to interact with the BMC 170 via the IPMI hardware interface 160, as well as with the virtual IPMI server 180. The IPMI module 130, the virtual IPMI module 140, the BMC 170, and/or the virtual IPMI server 180 may be configured to support an interface that is compatible with IPMI.

In one embodiment, the virtual IPMI server 180 may act as a "virtual" BMC interacting with "virtual" hardware components. In other words, the virtual IPMI server 180 neither contains a BMC nor any of the hardware components of the computer system 150. Instead, the virtual IPMI server 180 may mimic/emulate/simulate the behaviors of the BMC 170 monitoring the hardware components of the computer system 150. Further, the virtual IPMI server 180 may be configured to emulate the BMC 170 interacting with any kind of hardware components, even the ones that are not present or not supported in the computer system 150. The virtual IPMI server 180 may be a remote computer system communicating via a network with the virtual IPMI module 140. Alternatively, the virtual IPMI server 180 may be a server application executing on the same computer system as the hardware management system 100.

The IPMI hardware interface 160 may be a Keyboard Controller Style (KCS) interface provided by, for example, an Intel® 8742 Universal Peripheral Interface microcontroller. The IPMI hardware interface 160 may be controlled by a System Management Interface Chip (SMIC) for the computer system 150 that does not have a built-in hardware for a KCS interface. Further, the IPMI hardware interface 160 may be a Block Transfer (BT) interface, which may be implemented using an Application-Specific Integrated Circuit (ASIC) or Field Programmable Gate Array (FPGA), and has hardware buffers for holding upstream and downstream message blocks.

The IPMI hardware interface 160 may also include interfaces that allow the hardware components of the computer system 150 to communicate with the BMC 170. The IPMI hardware interface 160 may include the System Interface of the computer system 150, Intelligent Platform Management Bus (IPMB), Intelligent Chassis Management Bus (ICMB), LAN, serial/modem, and PCI management bus. Further, the computer system 150 may contain multiple and interconnecting BMC 170s configured to monitor and control different subsystems such as redundant power supplies, hot-swap Redundant Array of Independent Disks (RAID) system, expansion I/O, and others. The IPMI hardware interface 160 may be a side-band interface (e.g., SMBus) that is connected with the network controller 171, allowing the BMC 170 to communicate with a remote system via a network.

In one embodiment, the hardware management system 100, the computer system 150, and the virtual IPMI server 180 communicate with one another using IPMI messages. To illustrate, the following example uses two types of IPMI messages, an IPMI request and an IPMI response. An IPMI request generally refers to an IPMI message that is intended for the BMC 170 to process and may be associated with one or more hardware components, or one or more IPMI message types. An IPMI response generally refers to an IPMI message that can be generated by the BMC 170, or generated by an emulator of the BMC 170, in response to an IPMI request. The IPMI hardware interface 160 may receive an IPMI request 131 from the IPMI module 130 or an IPMI request 141 from the virtual IPMI module 140. The IPMI request 131 or the IPMI request 141 may be a request for information, such as status information, of one or more hardware components of the computer system 150 from the BMC 170. The IPMI request 131 or the IPMI request 141 may contain a network function field, a command field, and an optional data field. The command field of the IPMI request 131 or the IPMI request 141 may contain additional information, such as a device ID, manufacturer ID, product ID, firmware revision, and/or additional device support information for identifying the hardware component(s) that the IPMI request 131 or the IPMI request 141 is inquiring about.

After the IPMI hardware interface 160 transmits the received IPMI request 131 or IPMI request 141 to the BMC 170, the BMC 170 may process the IPMI request 131 or the IPMI request 141, and respond with an IPMI response 132 or IPMI response 142, respectively. The IPMI response 132 or the IPMI response 142 may contain a network function field, a command field, an optional data field, and a completion code field. Further, the IPMI response 132 or the IPMI response 142 may contain information related to the operating conditions of the hardware component(s) of the computer system 150. For example, the IPMI response 132 or the IPMI response 142 may contain measurements obtained from the sensors 173 or the operating status of the fans 176.

In one embodiment, the IPMI request 131 or the IPMI request 141 may be a request for information related to one or more types of information collected by the BMC 170. The different types of information may include, without limitation, system even log(SEL), sensor data record (SDR), field replaceable unit (FRU). In this case, the BMC 170 may respond with an IPMI response 132 or 142 that contains status information that belongs to the same type. The IPMI module 130 and the virtual IPMI module 140 may then optionally filter the received IPMI responses 132 and 142 to extract information related to one or more specific hardware components. The BMC 170 may also store historical status information related to the hardware components, until it receive explicit instructions to clear the stored historical status information.

In one embodiment, based on a switch setting, the virtual IPMI module 140 may be configured to either send the IPMI request 141 to the IPMI hardware interface 160, or send an IPMI request 143, which is the same or similar to the IPMI request 141, to the virtual IPMI server 180. To illustrate, suppose a test case requires placing the hardware component of the computer system 150 under a specific operating condition (e.g., the fans 176 being unplugged). To avoid physically unplugging the wires of the fans 176 in the computer system 150, the virtual IPMI module 140 is configured to send the IPMI request 143 to the virtual IPMI server 180, and the virtual IPMI server 180 is configured to emulate the BMC 170 and generate an IPMI response 144 in response to the IPMI request 143. The IPMI response 144 is the same or similar to an IPMI response 142 generated by the BMC 170 when the hardware component is actually placed under the specific operating condition in the computer system 150.

Moreover, the virtual IPMI server 180 may simultaneously support multiple hardware management systems 100. Thus, multiple virtual IPMI modules 140 from different hardware management systems 100 may communicate with the virtual IPMI server 180 to simulate certain operating conditions for the testing of the multiple computer systems 150.

In one embodiment, the virtual IPMI server 180 may utilize a BMC database 185 for storing raw data entries that are similar to actual IPMI responses collected from the BMC 170. The raw data entries may include some typical IPMI responses that the BMC 170 generates, and include status information related to various hardware components of the computer system 150. Further, the raw data entries may be updated based on test scenarios. For example, the BMC database 185 may contain raw data entries similar to IPMI responses generated by the BMC 180 when a fan 176 is unplugged in the computer system 150. The virtual IPMI server 180 may update these raw data entries to simulate the fan 176 being unplugged at a later moment or under a different situation, and return the updated data entries as the IPMI response 144 to the virtual IPMI 140.

From the perspective of the management applications 110 and the remote-access applications 120, the user application replies from the virtual IPMI module 140 may indicate that the fan 176 is unplugged, even though in reality, the fan 176 may still be connected in the computer system 150, or the fan 176 does not exist at all in the computer system 150. Thus, hardware testing of the computer system 150 may become autonomous, as the aforementioned virtual IPMI environment decouples the testing of the computer system 150 under various test scenarios from the actual physical conditions of the computer system 150. Extensive testing may even be possible without the physical existence of any of the computer system 150, hardware components, and/or the BMC 170.

Figure 2:
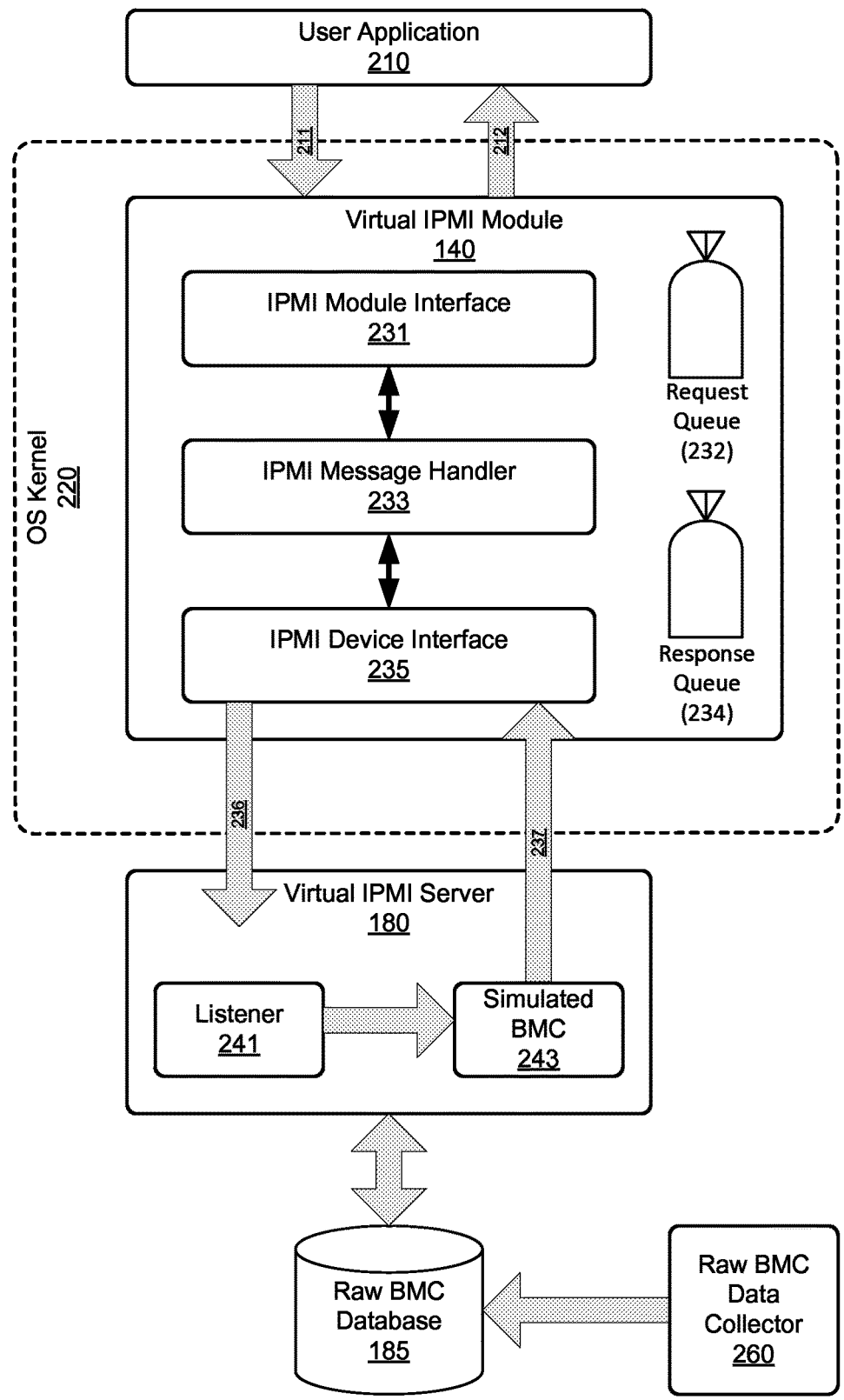
FIG. 2 illustrates one example of a virtual IPMI environment having a virtual IPMI module configured to interact with a virtual IPMI server, according to one embodiment of the present disclosure.

FIG. 2 illustrates one example of a virtual IPMI environment having a virtual IPMI module configured to interact with a virtual IPMI server, according to one embodiment of the present disclosure. In FIG. 2, the virtual IPMI module 140, which may correspond to the virtual IPMI module 140 of FIG. 1, may be configured to support a user application 210, which may correspond to the management application 110 or the remote-access application 120 of FIG. 1. The virtual IPMI module 140 may communicate with a virtual IPMI server 180, which may correspond to the virtual IPMI server 180 of FIG. 1. The virtual IPMI server 180 may utilize a raw BMC database 185, which may correspond to the raw BMC database 185 of FIG. 1. The virtual IPMI module 140 may be implemented as one or more kernel drivers and loaded into an OS kernel 220 of a hardware management system such as the hardware management system 100 of FIG. 1.

In one embodiment, the virtual IPMI module 140 may be implemented using layered components, including an IPMI module interface 231, an IPMI message handler 233, and an IPMI device interface 235. Each of the components may represent an OS kernel module. The IPMI module interface 231 may be the top layer that provides an Input/Output Control (IOCTL) interface to the user application 210. Once the IPMI module interface 231 is loaded into the OS kernal, the user application 210 may invoke the IPMI module interface 231 similar to opening and manipulating a device file. The IPMI message handler 233 may be a second layer for handling functions such as, without limitation, message routing, message handling, message timing, and message responding. The IPMI device interface 235 may be at a lower layer that implements the core functions related to virtual IPMI communications with the virtual IPMI server 180. The IPMI device interface 235 may also support functions related to communications with a BMC (similar to the BMC 170 of FIG. 1). That is, the IPMI device interface 235 may contain a switcher, which may be switched to one of the multiple values (e.g., "on" and "off") either manually, or by the user application 210. When switched to a first value, the IPMI device interface 235 may communicate with the virtual IPMI server 180. When switched to a second value, the IPMI device interface 235 may communicate with the BMC via an IPMI hardware interface (similar to the IPMI hardware interface 160 of FIG. 1).

In one embodiment, the virtual IPMI module 140 may contain a request queue 232 and a response queue 234. The request queue 232 may be used for storing the user application inquiries 211 received from the user application 210. The response queue 234 may be used for storing the user application replies 212 to be retrieved by the user application 210. Specifically, the user application 210 may initial a call to the IPMI module interface 231 with a user application inquiry 211. The call may trigger an operation to store the user application inquiry 211 to the request queue 232. Afterward, the call to the IPMI module interface 231 may be deemed completed, as the user application 210 may start to perform other functions without waiting for a user application reply 212. Asynchronously, the virtual IPMI module 140 may retrieve the user application inquiry 232 from the request queue 232, and perform its functions without the user application 210 waiting for the finishing of the functions.

In one embodiment, the user application 210 may initially be designed to interact with a conventional IPMI module (not shown in FIG. 2) similar to the IPMI module 130 of FIG. 1. In order to maintain compatibility and allow the user application 210 to interact with the virtual IPMI module 140, the IPMI module interface 231 for the virtual IPMI module 140 may have the same interface as the one used by the conventional IPMI module, so that the user application 210 may invoke the services provided by the virtual IPMI module 140 without having to make any code changes. Further, data structures transmitted between the IPMI module interface 231 and the user application 210 may also be kept the same as the ones transmitted between the user application 210 and the conventional IPMI module. In other words, the IPMI module interface 231 may be identical or similar to a corresponding IPMI module interface in the conventional IPMI module. Thus, no code-changing may be necessary for the user application 210 to interact with the conventional IPMI module or the virtual IPMI module 140.

Similarly, for compatibility, the routing mechanism and the authentication mechanism supported in the IPMI message handler 233 may be substantially the same as, or similar to, the respective mechanisms supported in the conventional IPMI module. The IPMI message handler 233 is also configured to accommodate the IPMI device interface 235, which supports functions associated with the virtual IPMI environment.

In particular, in one embodiment, the IPMI device interface 235 may be configured to provide an abstraction layer, so that the IPMI message handler 233 is unaware of how the IPMI device interface 235 may process the user application inquiry 211. To illustrate, suppose the user application 210 is configured to transmit a user application inquiry 211 to the virtual IPMI module 140. The user application inquiry 211 may be directed to a specific hardware component or a specific type of information associated with the computer system. Upon receiving the user application inquiry 211, the IPMI module interface 231 may send the user application inquiry 211 to the IPMI message handler 233. The IPMI message handler 233 may route the user application inquiry 211 to the IPMI device interface 235. Based on the user application inquiry 211, the IPMI device interface 235 may generate an IPMI request 236. The IPMI device interface 235 may transmit the IPMI request 236 either to a computer system having a BMC, or to the virtual IPMI server 180 based on an internal setting of the virtual IPMI module 140. In other words, from the perspective of the IPMI message handler 233, the IPMI device interface 235 may act as if it directly communicates with the BMC, while in reality, it communicates with the virtual IPMI server 180.

In one embodiment, the virtual IPMI server 180 may contain a listener 241, which utilizes an "epoll" event notification mechanism for listening and accepting incoming IPMI requests from the IPMI device interface 235. The listener 241 may pass the received IPMI request 236 to an emulated BMC 243 in the virtual IPMI server 180, which may be configured to emulate an actual BMC in a computer system. The emulated BMC 243 may generate an IPMI response 237 and send the IPMI response 237 to the virtual IPMI module 140. The IPMI device interface 235 may generate a specific user application reply in response to the IPMI response 237 that it receives. The IPMI message handler 233 may be configured to route multiple user application inquiries 211 received from the multiple user applications 210 to the IPMI device interface 235. The IPMI message handler 233 may also be configured to match each of the specific user application replies that it receives with the appropriate user application inquiries 211 from the specific user application 210. Then, the IPMI message handler 233 may send the matching information to the IPMI module interface 231, so that the IPMI module interface 231 may deliver an appropriate user application reply 212 to the specific user application 210 in response to a specific user application inquiry 211.

In one embodiment, the emulated BMC 243 may utilize raw data entries stored in the BMC database 185 to generate the IPMI response 237. A BMC data collector 260, which may reside in the same computer system also having a BMC, may be configured to collect raw IPMI responses from the BMC as the raw BMC data entries. For example, suppose a human operator physically unplugs one or more wires from a fan in a computer system, the BMC data collector 260 may be coupled with the BMC of the computer system and configured to retrieve IPMI responses from the BMC when the fan is being unplugged. Some of the retrieved IPMI responses may contain System Event Logs (SELs). The BMC data collector 260 may store the collected SELs (some of which are related to the unplugged fan) in the BMC database 185 as raw data entries for future usage. Furthermore, the virtual IPMI server 180 may also utilize raw data entries that correspond to bugs previously identified from a computer system to test whether the user application 210 may be able to handle errors caused by such bugs. The emulated BMC 243 in the virtual IPMI server 180 may transmit IPMI responses 237 containing error data or incomplete data to the user application 210 for testing purposes.

In one embodiment, each raw data entry in the BMC database 185 may contain an entry ID, timestamp, and/or hardware component information. The emulated BMC 243 may retrieve the raw data entries from the BMC database 185 and apply necessary adjustments. For example, some of raw data entries that the BMC data collector 260 collects and stores in the BMC database 185 may not include all data fields. In this case, the emulated BMC 243 may update the empty or default placeholders (e.g., replacing value '00' to a different one), or make adjustments (e.g., adjusting timestamps), to generate updated data entries. Although the updated data entries may not be written back to the BMC database 185, the virtual IPMI server 180 may use the updated data entries to generate the IPMI response 237. For example, to stress test a fan of a computer system being plugged and unplugged repeatedly, the virtual IPMI server 180 may adjust the timestamps of raw data entries retrieved from the BMC database 185 that correspond to the events of plugging and unplugging of the fan, and generate the IPMI responses 237 based on the updated data entries.

In one embodiment, the virtual IPMI server 180 may respond to an IPMI request 236 with one or more IPMI responses 237. Specifically, the virtual IPMI server 180 may first generate a first IPMI response 237 that contains IPMI header information related to the one or more additional IPMI responses 237 to be transmitted, and transmit the first IPMI response 237 to the IPMI device interface 235. The IPMI device interface 235 may evaluate the header information in the received first IPMI response 237, and transmit additional IPMI requests 236 to the virtual IPMI server 180 to retrieve the one or more additional IPMI responses 237. Further, each of the one or more additional IPMI responses 237 may or may not include updates made based on raw data entries. The updates may include modifying the timestamps of the SEL raw data entries to be later than the timestamp in the IPMI header information.

In one embodiment, the virtual IPMI module 140 may generate a user application reply based on a first IPMI response 237 obtained from the virtual IPMI server 180, and deliver the user application reply to the user application without analyzing the IPMI response 237. In this case, the user application may process the user application reply received from the virtual IPMI module 140, and evaluate the header information contained therein. If the header information indicates that there are additional IPMI responses 237 to be retrieved from the virtual IPMI server 180, the user application may issue additional user application inquires, instructing the virtual IPMI module 140 to retrieve the additional IPMI requests, and return these IPMI requests one-by-one as subsequent user application replies to the user application.

Figure 3:
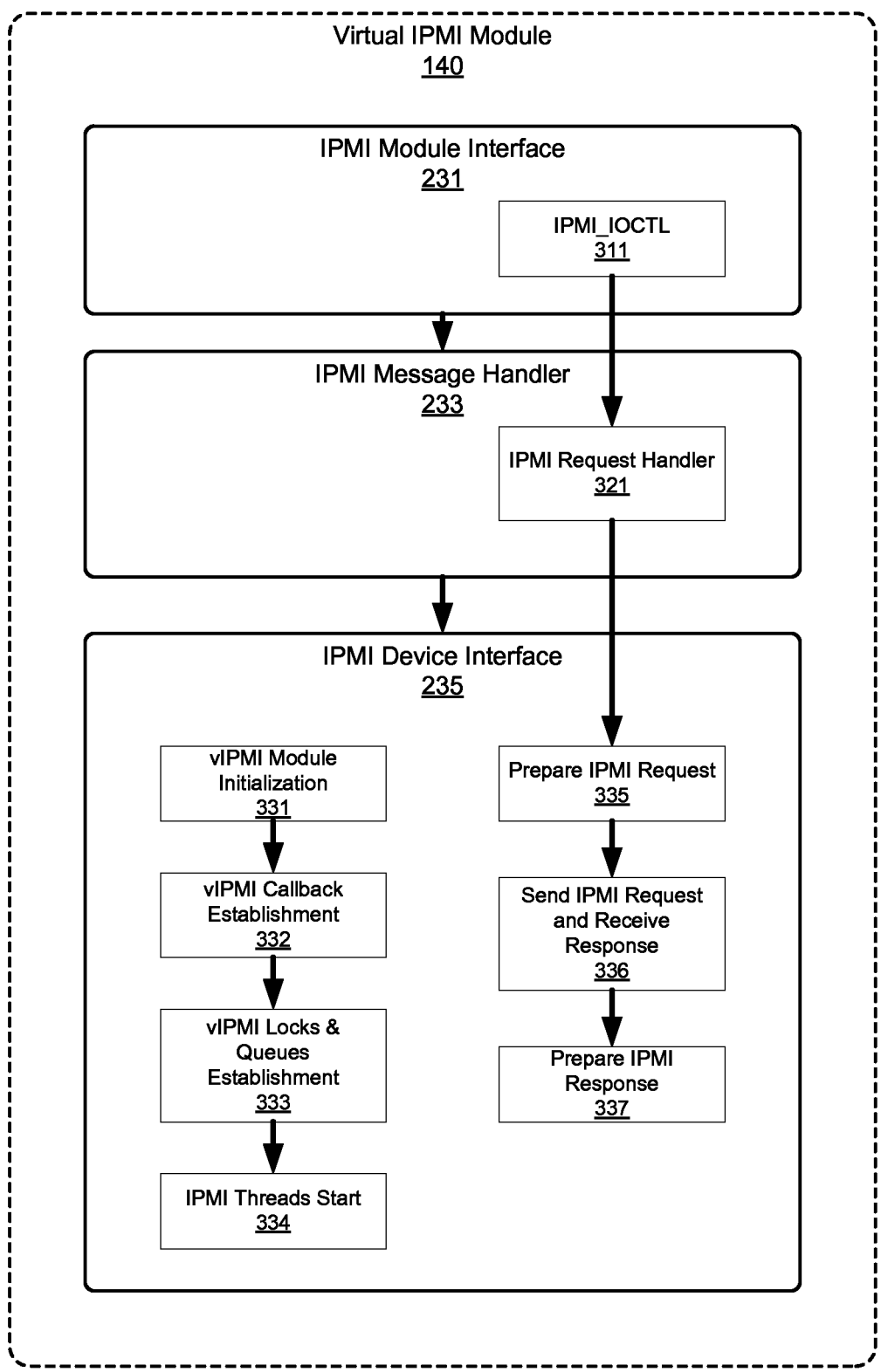
FIG. 3 illustrates one example of a virtual IPMI module performing kernel registration and information processing, according to one embodiment of the present disclosure.

FIG. 3 illustrates one example of a virtual IPMI module performing kernel registration and information processing, according to one embodiment of the present disclosure. Similar to the virtual IPMI module 140 of FIG. 2, the virtual IPMI module 140 in FIG. 3 also includes components such as an IPMI module interface 231, an IPMI message handler 233, and an IPMI device interface 235. These components may be loaded into the kernel of an operating system. Further, the virtual IPMI module 140 may have a request queue (not shown in FIG. 3, similar to the request queue 232 of FIG. 2), and a response queue (not shown in FIG. 3, similar to the response queue 234 of FIG. 2)

In one embodiment, the virtual IPMI module 140 may be registered with the kernel of an operating system through a registration process. One example registration process may include steps 331, 332, 333, and 334. At step 331, with two kernel module parameters, an IP address and a listening port of a virtual IPMI server, the IPMI device interface 235 may be configured to establish a network connection between the virtual IPMI module 140 and a virtual IPMI server that is similar to the virtual IPMI server 180 of FIG. 2. At step 332, virtual IPMI callback mechanisms may be bonded with the user data structures, and network sockets for sending and receiving data may be initialized. In other words, specific operations unique for the virtual IPMI module 140 may be invoked through the callback mechanisms.

In one embodiment, at step 333, the IPMI device interface 235 may establish virtual IPMI locks as well as the request and response queues. Specifically, the IPMI device interface 235 may utilize the request queue and the response queue for communicating with a user application. A lock may be necessary to prevent multiple threads of the IPMI message handler 233 or the IPMI module interface 231 from simultaneously accessing the request queue or the response queue. In one embodiment, the IPMI device interface 235 may support a timeout restriction to prevent errors that may occur during data transmissions, which could hang the IPMI device interface 235 threads. At step 334, the IPMI device interface 235 may start an IPMI thread for sending IPMI requests and retrieving IPMI responses. The IPMI thread may be configured to operate in a while loop for continuous listening and processing the IPMI messages.

In one embodiment, after the above kernel module registration process is completed, the virtual IPMI module 140 may be ready for processing user application inquires. A user application may first "send" a user application inquiry to the IPMI module interface 231 via a system call IOCTL. Specifically, an entry point IPMI_IOCTL 311 in the IPMI module interface 231 may be registered with the OS kernel for file operations, and may be invoked by the IOCTL system call. The user application inquiry may then be passed in by the IOCTL system call to the IPMI module interface 231, which in turn invokes the IPMI request handler 311 in the IPMI message handler 233. After having received the user application inquiry, the IPMI request handler 321 may first perform authentication checking, error handling, routing, sorting, and other functions. Afterward, the IPMI message handler 233 may forward the user application inquiry to the IPMI device interface 235, which may get a lock, store the user application inquiry to the request queue, and release the lock. At this point, the delivery of the user application inquiry by the IPMI_IOCTL 311 and the IPMI request handler 321 may be deemed completed. Asynchronously, the IPMI device interface 235 may use the thread allocated in the above step 334 to perform a function 335 for preparing an IPMI request. Specifically, the allocated thread may be configured to first get a lock, retrieve the user application inquiry from the request queue, and release the lock. The thread may then generate an IPMI request based on the retrieved user application inquiry. In one embodiment, the IPMI device interface 235 may also contain a function 336 for sending the IPMI requests to the virtual IPMI server, and receiving one or more IPMI responses from the virtual IPMI server. In one embodiment, one of the received IPMI responses may indicate that there are additional IPMI responses to be received. In this case, the IPMI device interface 235 may either transmit multiple IPMI requests to retrieve the additional IPMI responses, or wait for instructions from the user application to retrieve the additional IPMI responses. Afterward, the IPMI device interface 235 may perform a function 337 to prepare one or more user application replies based on the received IPMI responses.

The IPMI device interface 235 may transmit the user application replies to the IPMI message handler 233 and/or the IPMI module interface 231, which may obtain a lock, insert the user application replies to the response queue, and release the lock. Upon noticing any new data in the response queue by a "select" operation, the user application may then use a "receive" operation to obtain the user application replies from the response queue.

Figure 4:
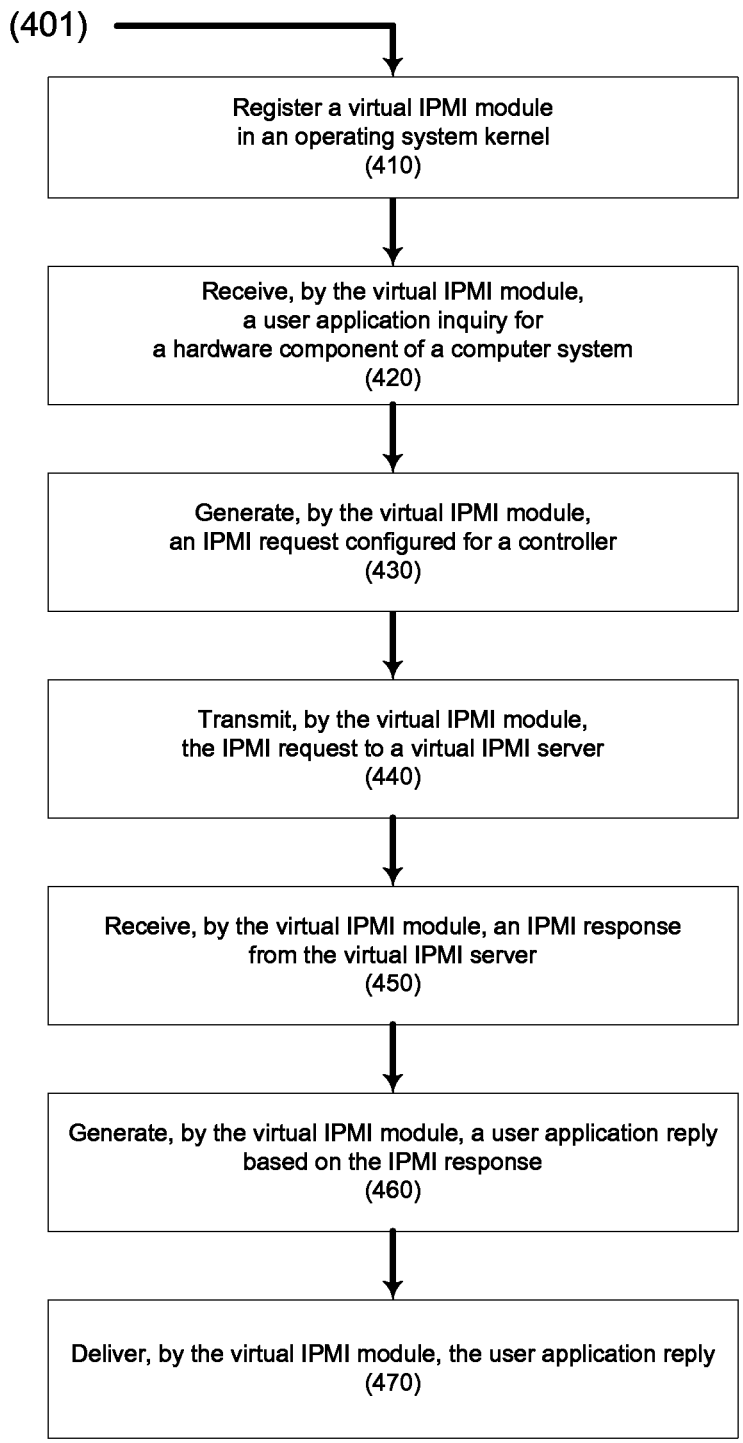
FIG. 4 is a flow chart illustrating one example process for implementing a virtual IPMI module, according to one embodiment of the present disclosure.

FIG. 4 shows a flow diagram illustrating one example process 401 for implementing a virtual IPMI module, according to one embodiment of the present disclosure. The process 401 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 410, a virtual IPMI module may be registered in an operating system kernel of a hardware management system that is configured to monitor and manage a computer system. The registration process may include receiving network connection parameters for a virtual IPMI server, initializing a network connection with the virtual IPMI server using the network connection parameters, and configuring a request queue and a response queue for receiving and delivering user application inquiries and replies from/to a user application. After registration, the virtual IPMI module may be ready for simulating the computer system having one or more hardware components.

At block 420, the virtual IPMI module may receive a user application inquiry from a user application executing on the operating system of the hardware management system or a remote system. The user application inquiry may request for one or more types of information related to one or more hardware components of the computer system. Further, the virtual IPMI module may store the user application inquiry to a request queue resided in an operating system kernel executing on the computer system.

At block 430, the virtual IPMI module may asynchronously retrieve the user application inquiry from the request queue, and generate an IPMI request based on the user application inquiry. Thus, the IPMI request may request for one or more types of information which may be associated with one or more hardware components of the computer system. Further, the IPMI request may be configured for a controller (e.g., a BMC), which is configured to interact with the one or more hardware components. In other words, the IPMI request may be compatible with the IPMI standard, and/or supported by the controller, even though it may be delivered to the virtual IPMI server, not to the controller. In one embodiment, the controller may be installed in the computer system. Alternatively, the computer system may not have a controller present.

At block 440, the virtual IPMI module may transmit the IPMI request to the virtual IPMI server separate from the computer system. The virtual IPMI server is configured to emulate the controller of the computer system. In one embodiment, upon detecting a setting to bypass the virtual IPMI server and utilize the controller, instead of transmitting the IPMI request to the virtual IPMI server, the virtual IPMI module is configured to transmit the IPMI request to the controller in the computer system. The virtual IPMI module may receive from the controller an IPMI response which is generated by the controller in response to the IPMI request.

At block 450, the virtual IPMI module may receive an IPMI response from the virtual IPMI server, the IPMI response is based on a simulated operating condition of a hardware component of the computer system at the virtual IPMI server. Specifically, the virtual IPMI server may generate the IPMI response, which is the same or similar IPMI response from the controller monitoring and detecting the operating condition of the hardware component. With the availability of the simulated operating condition of the hardware of component of the computer system, manual adjustment of the hardware component becomes unnecessary. The manual adjustment may include an operator manually pulling the wires of a fan, or configuring the hardware component to the operating condition via a user interface provided by the user application. The operating condition of the hardware component may be simulated based on prior data collected by the controller when the hardware component was manually adjusted. Further, the virtual IPMI server may emulate the response of the controller for the operating condition of a hardware component even when the computer system does not physically contain the specific hardware component.

At block 460, the virtual IPMI module may generate a user application reply for the user application inquiry based on the IPMI response. In one embodiment, the virtual IPMI module may receive one or more IPMI responses that contain status information for the one or more hardware components. Afterward, the virtual IPMI module may generate the user application reply based on the one or more IPMI responses.

At block 470, the virtual IPMI module may deliver the user application reply to the operating system kernel. Specifically, the virtual IPMI module may utilize a response queue in the operating system kernel for storing the user application reply. Afterward, the user application may poll the virtual IPMI module to retrieve the user application reply.

Figure 5:
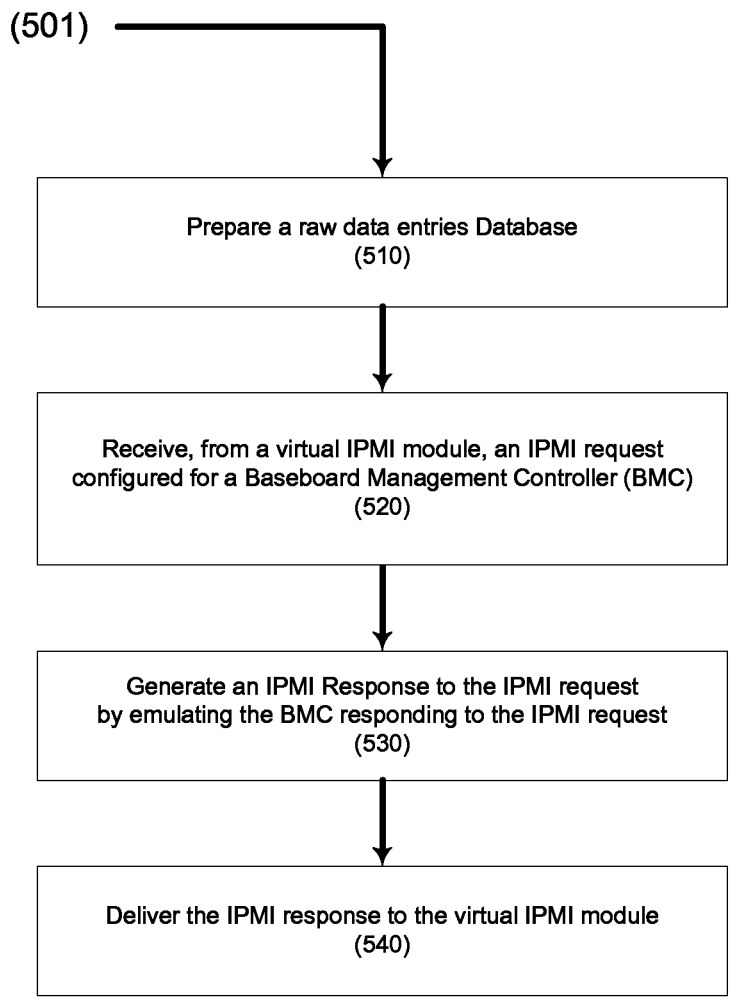
FIG. 5 is a flow chart illustrating one example process for simulating a BMC responding to an IPMI request, according to one embodiment of the present disclosure.

FIG. 5 shows a flow diagram illustrating one example process 501 for simulating a BMC responding to an IPMI request, according to one embodiment of the present disclosure. The process 501 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

At block 510, a virtual IPMI server may prepare a database for storing raw data entries, which may be collected when the BMC detects events occurring under various operating conditions and associated with a specific hardware component of the computer system. For example, the BMC may detect a fan being unplugged from the computer system and generate corresponding IPMI responses.

At block 520, the virtual IPMI server may receive, from a virtual IPMI module executing on the computer system, an IPMI request configured for instructing a BMC of the computer system. Specifically, based on the IPMI request, the BMC may be instructed to interact with one or more hardware components of the computer system. For example, one hardware component may be a fan of the computer system, and the IPMI request may include a request for status information related to the fan. Alternatively, the IPMI request may be any IPMI message requesting for one or more specific types of status information related to the supported hardware components of the computer system.

At block 530, the virtual IPMI server may generate an IPMI response to the IPMI request by simulating a response that the BMC is configured to generate when the BMC detects an operating condition of the hardware component. Specifically, upon receiving the IPMI request, the virtual IPMI server may fetch raw data entries from the raw data entries database corresponding to the information requested in the IPMI request. The virtual IPMI server may alter the fetched raw data entries to simulate various operating conditions of the hardware component. For example, the virtual IPMI server may simulate an abnormal operating condition such as a fan being unplugged, or a sensor detecting malfunctions and/or unexpected shutdowns in the computer system. Further, the virtual IPMI server may simulate a hardware component when such hardware component is not located in the computer system. For example, even though the computer system may not contain a graphic card, the virtual IPMI server may nevertheless simulate the BMC interacting with the non-existence graphic card and respond with corresponding information related to the non-existence graphic card. Thus, in situations when a graphic card is not available, the user applications may nevertheless test interacting with the non-existence graphic card by processing the simulated information received from the IPMI server.

In one embodiment, the virtual IPMI server may construct an IPMI response based on the altered or not-altered raw data entries. At block 540, the virtual IPMI server may deliver the IPMI response to the virtual IPMI module.

Systems and methods for establishing a virtual IPMI environment have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable storage medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for remotely testing hardware components of a device, comprising:

preparing, at an Intelligent Platform Management Interface (IPMI) server, a database that includes raw data entries collected during events associated with the hardware components of the device;

receiving, at the IPMI server, an IPMI request from the device;

based on the IPMI request, fetching a first set of raw data entries from the database corresponding to information requested in the IPMI request;

altering the first set of raw data entries to simulate, on the IPMI server, an operating condition of a hardware component of the device, the altering including at least one of:

updating data fields in the first set of raw data entries that include one of an empty and a default placeholder, and adjusting at least one timestamp of at least one data entry; and transmitting, from the IPMI server to the device, an IPMI response based on the simulated operating condition of the hardware component of the device.

2. The method of claim 1, wherein the IPMI request is generated based on a user application inquiry from an operating system kernel executing on the device.

3. The method of claim 1, further comprising sending network connection parameters from the IPMI server to the device.

4. The method of claim 1, wherein the simulated operating condition of the hardware component of the device is based on previously collected data associated with a manual adjustment of the hardware component of the device.

5. The method of claim 4, wherein the previously collected data is transmitted from the device to the IPMI server before the IPMI response is transmitted from the IPMI server to the device.

6. The method of claim 1, wherein the IPMI response is generated by the IPMI server even though the hardware component of the device that is the subject of the simulated operating condition is not installed in the device.

7. The method of claim 1, further comprising:
receiving, at the IPMI server, a second IPMI request from a second device;
based on the second IPMI request, fetching a second set of raw data entries from the raw data entries database corresponding to information requested in the IPMI request;
altering the second set of fetched raw data entries to simulate, on the IPMI server, an operating condition of a hardware component of the second device; and
transmitting, from the IPMI server to the second device, an IPMI response based on the simulated operating condition of the hardware component of the second device,
wherein the stages associated with the device occur simultaneously with the stages associated with the second device.

8. A non-transitory, computer-readable storage medium comprising instructions that, when executed by a processor of an IPMI server, cause the processor to perform stages for remotely testing hardware components of a device, the stages comprising:
preparing, at the IPMI server, a database that includes raw data entries collected during events associated with the hardware components of the device;
receiving, at the IPMI server, an IPMI request from the device;
based on the IPMI request, fetching a first set of raw data entries from the database corresponding to information requested in the IPMI request;
altering the first set of raw data entries to simulate, on the IPMI server, an operating condition of a hardware component of the device, the altering including at least one of:
updating data fields in the first set of raw data entries that include one of an empty and a default placeholder, and
adjusting at least one timestamp of at least one data entry; and
transmitting, from the IPMI server to the device, an IPMI response based on the simulated operating condition of the hardware component of the device.

9. The non-transitory, computer-readable storage medium of claim 8, wherein the IPMI request is generated based on a user application inquiry from an operating system kernel executing on the device.

10. The non-transitory, computer-readable storage medium of claim 8, the stages further comprising sending network connection parameters from the IPMI server to the device.

11. The non-transitory, computer-readable storage medium of claim 8, wherein the simulated operating condition of the hardware component of the device is based on previously collected data associated with a manual adjustment of the hardware component of the device.

12. The non-transitory, computer-readable storage medium of claim 11, wherein the previously collected data is transmitted from the device to the IPMI server before the IPMI response is transmitted from the IPMI server to the device.

13. The non-transitory, computer-readable storage medium of claim 8, wherein the IPMI response is generated by the IPMI server even though the hardware component of the device that is the subject of the simulated operating condition is not installed in the device.

14. The non-transitory, computer-readable storage medium of claim 8, the stages further comprising:
receiving, at the IPMI server, a second IPMI request from a second device;
based on the second IPMI request, fetching a second set of raw data entries from the raw data entries database corresponding to information requested in the IPMI request;
altering the second set of fetched raw data entries to simulate, on the IPMI server, an operating condition of a hardware component of the second device; and
transmitting, from the IPMI server to the second device, an IPMI response based on the simulated operating condition of the hardware component of the second device,
wherein the stages associated with the device occur simultaneously with the stages associated with the second device.

15. A system for remotely testing hardware components of a device, comprising:
an IPMI server configured to:
prepare a database that includes raw data entries collected during events associated with the hardware components of the device;
receive an IPMI request from the device;
based on the IPMI request, fetch a first set of raw data entries from the database corresponding to information requested in the IPMI request;
alter the first set of raw data entries to simulate an operating condition of a hardware component of the device, IPMI server alters the first set of raw data entries by at least one of:
updating data fields in the first set of raw data entries that including one of an empty and a default placeholder, and
adjusting at least one timestamp of at least one data entry; and
transmit to the device an IPMI response based on the simulated operating condition of the hardware component of the device.

16. The system of claim 15, wherein the IPMI request is generated by the IPMI server based on a user application inquiry from an operating system kernel executing on the device.

17. The system of claim 15, wherein the IPMI server is further configured to send network connection parameters from the IPMI server to the device.

18. The system of claim 15, wherein the simulated operating condition of the hardware component of the device is based on previously collected data associated with a manual adjustment of the hardware component of the device.

19. The system of claim 15, wherein the previously collected data is transmitted from the device to the IPMI server before the IPMI response is transmitted from the IPMI server to the device.

20. The system of claim 15, wherein the IPMI response is generated by the IPMI server even though the hardware component of the device that is the subject of the simulated operating condition is not installed in the device.

* * * * *